(12) United States Patent
Dierschke et al.

(10) Patent No.: US 10,392,306 B2
(45) Date of Patent: Aug. 27, 2019

(54) POLYCONDENSATION PRODUCT BASED ON AROMATIC COMPOUNDS, METHOD FOR THE PREPARATION AND USE THEREOF

(71) Applicant: Construction Research & Technology, GmbH, Trostberg (DE)

(72) Inventors: Frank Dierschke, Oppenheim (DE); Torben Gädt, Traunstein (DE); Uwe Gehrig, St. Georgen (DE); Michael Melchart, Ludwigshafen (DE); Mario Vierle, Wasserburg (DE); Peter Schwesig, Wasserburg (DE); Klaus Hartl, Tacherting (DE); Madalina Andreea Stefan, Trostberg (DE); Tatiana Mitkina, Traunstein (DE); Maxim Pulkin, Rosenheim (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 15/339,275

(22) Filed: Oct. 31, 2016

(65) Prior Publication Data

US 2017/0044064 A1    Feb. 16, 2017

Related U.S. Application Data

(62) Division of application No. 14/390,703, filed as application No. PCT/EP2013/056761 on Apr. 3, 2013.

(30) Foreign Application Priority Data

Apr. 11, 2012    (EP) .................................. 12163706

(51) Int. Cl.
 C04B 24/30    (2006.01)
 C08G 8/28     (2006.01)
 (Continued)

(52) U.S. Cl.
 CPC .............. *C04B 24/30* (2013.01); *C04B 24/22* (2013.01); *C04B 24/246* (2013.01);
 (Continued)

(58) Field of Classification Search
 CPC ....... C04B 24/30; C04B 24/22; C04B 24/246; C04B 24/302; C04B 40/0039; C08G 8/28;
 (Continued)

(56) References Cited

U.S. PATENT DOCUMENTS

| 4,349,386 A | 9/1982 | Davidovits |
| 4,472,199 A | 9/1984 | Davidovits |

(Continued)

FOREIGN PATENT DOCUMENTS

| DE | 15 93 758 A1 | 10/1970 |
| DE | 16 71 017 A1 | 9/1971 |

(Continued)

OTHER PUBLICATIONS

Criado et al. Microstructural and Mechanical Properties of Alkali Activated Colombian Raw Materials. Materials 2016, 9, 158; doi:10.3390/ma9030158.*

(Continued)

*Primary Examiner* — John E Uselding
(74) *Attorney, Agent, or Firm* — Curatolo Sidoti Co., LPA; Joseph G. Curatolo; Floyd Trillis, III

(57) ABSTRACT

Proposed is a polycondensation product comprising as monomer components at least one aryl polyoxyalkylene ether, at least one vicinally disubstituted aromatic compound, at least one aldehyde and also optionally further aromatic compounds; processes for preparing same, and also use thereof as dispersant for aqueous suspensions of inorganic binders and as grinding assistant for inorganic binders.

17 Claims, 1 Drawing Sheet

(51) Int. Cl.
  *C08G 12/40* (2006.01)
  *C08G 16/02* (2006.01)
  *C04B 40/00* (2006.01)
  *C04B 24/22* (2006.01)
  *C04B 24/24* (2006.01)
  *C04B 103/40* (2006.01)
  *C04B 103/52* (2006.01)

(52) U.S. Cl.
  CPC ........ *C04B 24/302* (2013.01); *C04B 40/0039* (2013.01); *C08G 8/28* (2013.01); *C08G 12/40* (2013.01); *C08G 16/0218* (2013.01); *C08G 16/0243* (2013.01); *C04B 2103/408* (2013.01); *C04B 2103/52* (2013.01); *Y02P 40/20* (2015.11)

(58) Field of Classification Search
  CPC . C08G 12/40; C08G 16/0218; C08G 16/0243
  See application file for complete search history.

(56) References Cited

U.S. PATENT DOCUMENTS

| | | | |
|---|---|---|---|
| 4,509,985 A | 4/1985 | Davidovits et al. | |
| 4,725,665 A | 2/1988 | Pieh et al. | |
| 5,651,817 A * | 7/1997 | Yamato | C04B 24/30 106/802 |
| 5,707,445 A | 1/1998 | Yamato et al. | |
| 6,048,659 A | 4/2000 | Inoue et al. | |
| 6,376,581 B1 | 4/2002 | Tanaka et al. | |
| 6,462,110 B2 | 10/2002 | Satoh et al. | |
| 7,910,640 B2 | 3/2011 | Wieland et al. | |
| 8,053,498 B2 | 11/2011 | Wieland et al. | |
| 8,202,362 B2 | 6/2012 | Davidovits et al. | |
| 8,653,186 B2 | 2/2014 | Nicoleau et al. | |
| 8,907,016 B2 | 12/2014 | Vierle et al. | |
| 9,006,313 B2 | 4/2015 | Kraus et al. | |
| 9,018,337 B2 | 4/2015 | Chen et al. | |
| 9,045,377 B2 | 6/2015 | Nicoleau et al. | |
| 2006/0249056 A1 | 11/2006 | Shiba et al. | |
| 2008/0108732 A1 | 5/2008 | Wieland et al. | |
| 2009/0054558 A1 | 2/2009 | Wieland et al. | |
| 2010/0004357 A1 | 1/2010 | Shiba et al. | |
| 2011/0054053 A1 | 3/2011 | Lee et al. | |
| 2011/0269875 A1 | 11/2011 | Nicoleau et al. | |
| 2011/0281975 A1 | 11/2011 | Kraus et al. | |
| 2012/0208932 A1 | 8/2012 | Kraus et al. | |
| 2013/0098271 A1 * | 4/2013 | Eberwein | C04B 28/02 106/692 |

FOREIGN PATENT DOCUMENTS

| | | |
|---|---|---|
| DE | 10 2004 050 395 A1 | 4/2006 |
| DE | 10 2005 060 947 A1 | 6/2007 |
| EP | 0 214 412 A1 | 3/1987 |
| EP | 0 780 348 A1 | 6/1997 |
| EP | 1 110 981 A2 | 6/2001 |
| EP | 1 142 847 A2 | 10/2001 |
| WO | WO 85/03699 | 8/1985 |
| WO | WO 2006/042709 A1 | 4/2006 |
| WO | WO 2008/012438 A2 | 1/2008 |
| WO | WO 2010/026155 A1 | 3/2010 |
| WO | WO 2010/040612 A1 | 4/2010 |
| WO | WO 2011/026701 A1 | 3/2011 |

OTHER PUBLICATIONS

PCT/EP2013/056761—International Search Report, dated Aug. 7, 2013.
PCT/EP2013/056761—International Written Opinion, dated Aug. 7, 2013.
PCT/EP2013/056761—International Preliminary Report on Patentability, dated Oct. 14, 2014.

* cited by examiner

POLYCONDENSATION PRODUCT BASED ON AROMATIC COMPOUNDS, METHOD FOR THE PREPARATION AND USE THEREOF

The present application is a divisional of co-pending U.S. Ser. No. 14/390,703, having a 35 U.S.C. 371(c) date of Oct. 3, 2014, which is a national stage application of International Application No. PCT/EP2013/056761, filed Apr. 3, 2013, which claims the benefit of European Application No. 12163706.0, filed Apr. 11, 2012, which applications are incorporated herein by reference.

The present invention relates to a polycondensation product comprising as monomer components at least one aryl polyoxyalkylene ether, at least one vicinally disubstituted aromatic compound, at least one aldehyde and also optionally further aromatic compounds; to processes for preparing same, and also to the use thereof as dispersants for aqueous suspensions of inorganic binders and as grinding assistants for inorganic binders.

Portland cement was first referred to in British Patent BP 5022, since which time it has undergone continual further development. It is nowadays considered one of the most widespread inorganic binders. Portland cement hardens hydraulically by virtue of its high CaO content.

Certain slags from metallurgical processes can be used in the form of latent hydraulic binders as admixtures to Portland cement. Also possible is activation with strong alkalis, such as alkali metal hydroxides or waterglasses, for example.

Inorganic binder systems based on reactive, water-insoluble compounds on the basis of $SiO_2$ in conjunction with $Al_2O_3$, which cure in an aqueous-alkali medium, are likewise common knowledge. Cured binder systems of this kind are also called "geopolymers" and are described for example in U.S. Pat. No. 4,349,386, WO 85/03699 and U.S. Pat. No. 4,472,199.

Reactive oxide mixtures employed in this context include metakaolin, microsilica, slags, fly ashes, activated clay, pozzolans or mixtures thereof. The alkali medium for activating the binders consists typically of aqueous solutions of alkali metal carbonates, alkali metal fluorides, alkali metal hydroxides, alkali metal aluminates and/or alkali metal silicates, such as soluble waterglass. In comparison to Portland cement, geopolymers may be more cost-effective and more stable, and may have a more favourable $CO_2$ emissions balance.

Aqueous cement suspensions are often admixed with admixtures in the form of dispersants in order to improve their processing properties, such as kneadability, fluidity, sprayability, spreadability or pumpability. These admixtures are capable of disrupting agglomerates, by adsorption to the surface of the particles, and of dispersing the particles formed. Especially in the case of highly concentrated dispersions, this results in a marked improvement in processing properties.

In the production of cementitious construction material mixtures such as concrete, this effect can be utilized to particularly advantageous effect, since otherwise, in order to achieve a readily processable consistency, substantially more water would be needed than would be necessary for the subsequent hydration process. As a result of this excess water, which gradually evaporates after hardening has taken place, cavities remain which significantly impair the mechanical strength and robustness of the constructions. The said plasticizers or dispersants are used in order to reduce the water fraction which is excessive in the sense of hydration, and/or to optimize the processing properties for a given water/cement ratio.

Examples of the cement dispersants or plasticizers used primarily to date are salts of naphthalenesulphonic acid/formaldehyde condensates (cf. EP 214412 A1; identified hereinafter as naphthalenesulphonates), salts of melaminesulphonic acid/formaldehyde condensates (cf. DE 1671017 A; identified below as melaminesulphonates), and also salts of polycarboxylic acids (cf. U.S. Pat. No. 5,707,445 B1, EP 1110981 A2, EP 1142847 A2; identified below as polycarboxylates). Such polycarboxylates are prepared mostly by radical copolymerization of ethylenically unsaturated carboxylic acids (such as acrylic acid, methacrylic acid or maleic acid and/or salts thereof) and poly(alkylene oxides) having a polymerizable end group (such as methacrylates, allyl ethers or vinyl ethers). This mode of preparation leads to polymers having a comblike structure.

The activity of the molecules used derives from two different effects. Firstly, the negatively charged acid groups of the plasticizers adsorb on the cement grain surface, which is positively charged through calcium ions. The electrostatic double layer formed in this way results in electrostatic repulsion between the particles, which is relatively weak, however. In the case of the abovementioned comb polymers, this electrostatic repulsion is reinforced additionally by the steric bulk of the non-adsorbing poly(alkylene oxide) chains. This steric repulsion is very much stronger than the electrostatic repulsion, and so it is easy to explain why the plasticizing effect of the polycarboxylates is very much greater than that of the naphthalene- or melamine-sulphonates; in other words, in order to obtain comparable plasticization, the polycarboxylate can be added at a significantly lower rate.

WO 2006/042709 A1 describes a polycondensation product consisting of A) an aromatic or heteroaromatic compound having 5 to 10 C atoms and/or heteroatoms, this compound possessing on average 1 to 300 oxyethylene and/or oxypropylene groups per molecule, which are linked via an O or N atom to the aromatic or heteroaromatic compound; and also, optionally, B) an aromatic compound selected from the group of phenols, phenol ethers, naphthols, naphthol ethers, anilines, furfuryl alcohols and/or an amino resin former selected from the group of melamine (derivatives), urea (derivatives) and carboxamides; and C) an aldehyde selected from the group of formaldehyde, glyoxylic acid and benzaldehyde or mixtures thereof, it being possible for the benzaldehyde to contain, additionally, acid groups in the form of $COOM_a$, $SO_3M_a$ and $PO_3M_a$, and for M to be H, alkali metal or alkaline earth metal, ammonium or organic amine radicals, and also for a to be ½, 1 or 2. It was found that this polycondensation product produces very good plasticization in hydraulic binders, such as cement. As compared with naphthalenesulphonates or melaminesulphonates, it results in substantially better plasticization of the construction material in conjunction with a lower rate of addition, and the fluidity can be maintained over a longer period of time. In WO 2006/042709 A1, however, in contrast to the present invention, there is no description as component B) of any vicinally disubstituted aromatic compounds.

A further example of a polycondensation product is described in EP 0780348 A1, as a dispersant for cement. In that patent, components including alkoxylated phenol and hydroxybenzoic acids are subjected to a polycondensation in the presence of formaldehyde.

The aforementioned geopolymers exhibit distinct differences relative to the cementitious systems, these differences making it more difficult or impossible to use the stated plasticizers. In order to obtain acceptable hardening times, the reactive oxide components require strong alkaline activation. This higher level of alkalinity imposes particular requirements on the dispersants, these requirements, in the case of many commercial concrete plasticizers, not being sufficiently ensured. Furthermore, these low-calcium systems generally do not have any positively charged grain surfaces. Instead, the surfaces are silicatic or $SiO_2$ surfaces. Moreover, the high level of alkalinity that is required for activation also constitutes a high salt load, which may annul a dispersion effect that is possible at lower pH levels (comparably to the cement).

The problem addressed by the inventors was that of substantially avoiding at least some of the disadvantages of the prior art discussed above. The intention more particularly was to find dispersants which are capable of adsorbing to low-calcium binders at relatively high pH levels and hence also of plasticizing geopolymer systems. These dispersants ought to exhibit high affinity for silicatic surfaces, preferably even at very high pH levels. They ought ideally also to be suitable for the dispersing of mixed systems comprising not only Portland cement but also geopolymer raw materials, such as microsilica, slags, fly ashes, clays, pozzolans or mixtures thereof (known as "supplemental cementitious materials" or "SCM"); in other words, they ought also to be suitable for composite cements in categories CEM II-V and also CEM X (currently non-standardized composite cements with a high level of SCM additions).

The problems identified above are solved with the features of the independent claims. The dependent claims relate to preferred embodiments.

It has surprisingly been found that the polycondensation products of the invention, which comprise in the polymer chain at least one vicinally disubstituted aromatic monomer component, such as pyrocatechol, salicylic acid or dihydroxybenzoic acid, are capable, even at relatively high pH levels, of dispersing low-calcium inorganic binders, more particularly geopolymers. The polyoxyalkylene groups attached by ether bonds, moreover, are substantially more stable to hydrolysis than the polyoxyalkylene groups, attached via ester bonds, of the known, prior-art polycarboxylate ethers. Entirely surprisingly, the polycondensation products of the invention are also suitable as grinding assistants for inorganic binders.

The present invention accordingly provides a polycondensation product comprising as monomer components:
A) at least one aryl polyoxyalkylene ether of the formula (I)

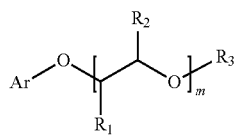

(I)

where
Ar is an aryl group,
$R_1$ and $R_2$ each independently of one another are selected from H, methyl and ethyl, with preferably at least one of the groups $R_1$ and $R_2$ being H,
m is an integer from 1 to 300 and
$R_3$ is selected from the group consisting of H, alkyl, aryl, aralkyl, alkaryl, phosphate, and also mixtures thereof;
B) at least one aromatic compound of the formula (II),

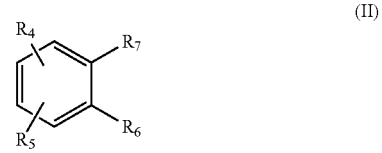

(II)

where $R_4$ and $R_5$ each independently of one another are selected from H, $R_8$, OH, $OR_8$, $C(O)R_8$, COOH, $COOR_8$, $SO_3H$, $SO_3R_8$ and $NO_2$ and also alkali metal salts, alkaline earth metal salts and ammonium salts thereof, or together are a further fused-on ring, where $R_8$ each independently is selected from the group consisting of alkyl, aryl, aralkyl, alkaryl, and $R_6$ and $R_7$ each independently of one another are selected from OH, $OR_9$, $C(O)R_9$, COOH and $COOR_9$ and also alkali metal salts and alkaline earth metal salts and ammonium salts thereof, where $R_9$ each independently is selected from the group consisting of alkyl, aryl, aralkyl, alkaryl;
C) at least one aldehyde; and also optionally
D) at least one further aromatic compound, selected from the group consisting of phenol, 2-phenoxyethanol, 2-phenoxyethyl phosphate and phosphonate, 2-phenoxyacetic acid, 2-(2-phenoxyethoxy)ethanol, 2-(2-phenoxyethoxy)ethyl phosphate and phosphonate, 2-[4-(2-hydroxyethoxy)phenoxy]ethyl phosphate and phosphonate, 2-[4-(2-phosphonatooxyethoxy)phenoxy]ethyl phosphate and phosphonate, methoxyphenol, phenolsulphonic acid, furfuryl alcohol, and also mixtures thereof.

Where at least one of the substituents in the general formula (II) is a COOH group, it is preferred for the groups $R_6$ and $R_7$ each to be OH groups.

The aryl group "Ar" is a homo- or heteroaryl group, preferably a homoaryl group, having 6 to 10 carbon atoms in the ring system, more particularly a phenyl group or a naphthyl group. The group Ar may additionally be substituted by one or more further groups, which are selected from $C_{1-10}$ alkyl, $C_{1-10}$ alkoxy, $C_{6-10}$ aryl, $C_{7-11}$ aralkyl, $C_{7-11}$ alkaryl, preferably methoxy.

The number "m" is preferably an integer from 3 to 280, more preferably from 10 to 160 and more particularly from 12 to 120.

"$R_3$" is preferably selected from the group consisting of H, $C_{1-10}$ alkyl, $C_{6-10}$ aryl, $C_{7-11}$ aralkyl, $C_{7-11}$ alkaryl and phosphate, with $R_3$ being more particularly H.

The oxyalkylene groups of the aryl polyoxyalkylene ether of the formula (I) are preferably selected from ethylene oxide and/or propylene oxide groups which are arranged randomly, alternatingly, graduatedly and/or blockwise along the polyoxyalkylene chain.

With particular preference the aryl polyoxyalkylene ether of the formula (I) is a polyethylene glycol monophenyl ether of the formula (III),

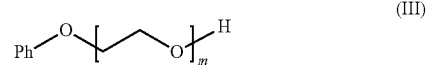

(III)

where m has the specified definition.

This polyethylene glycol monophenyl ether of the formula (III) may also comprise a mixture having different values for m within the definition specified above.

The abovementioned groups "$R_8$" and "$R_9$" are preferably each independently of one another selected from $C_{1-10}$ alkyl, $C_{6-10}$ aryl, $C_{7-11}$ aralkyl and $C_{7-11}$ alkaryl and more particularly are H.

In accordance with particularly preferred embodiments, the aromatic compounds of the formula (II) are selected from the group consisting of benzene-1,2-diol, benzene-1,2,3-triol, 2-hydroxy-benzoic acid, 2,3- and 3,4-dihydroxybenzoic acid, 3,4,5-trihydroxybenzoic acid, phthalic acid, 3-hydroxyphthalic acid, 2,3- and 3,4-dihydroxybenzenesulphonic acid, 1,2- and 2,3-dihydroxy-naphthalene, 1,2- and 2,3-dihydroxynaphthalene-5- or -6-sulphonic acid, and also mixtures thereof.

More particularly preferred in this context are benzene-1,2-diol, benzene-1,2,3-triol, 2,3- and 3,4-dihydroxybenzoic acid, 2,3- and 3,4-dihydroxybenzenesulphonic acid, 1,2- and 2,3-dihydroxynaphthalene, 1,2- and 2,3-dihydroxynaphthalene-5- or -6-sulphonic acid, and also mixtures thereof, while, for example, 2-hydroxybenzoic acid is less preferred.

Here as well, as already stated generally in relation to component B, alkali metal salts, alkaline earth metal salts and ammonium salts of the corresponding acids are possible. For the purposes of the present invention, "ammonium salts" is intended to refer both to $NH_4^+$ salts and to salts of amines or nitrogen-containing polymers such as, for instance, polyethyleneimine salts. Moreover, as far as the completed polycondensation product is concerned, it is immaterial whether the said aromatic compounds are used directly as salts or whether these salts are only obtained following an acidic polycondensation, by neutralization. At very high pH levels, of the kind encountered in the geopolymers sector, the amines and/or nitrogen-containing polymers may also be present in free form.

The aldehyde component C) is preferably selected from the group consisting of formaldehyde, paraformaldehyde, glyoxylic acid, benzaldehyde, benzaldehydesulphonic acid, benzaldehydedisulphonic acid, vanillin and isovanillin, and also mixtures thereof. Formaldehyde as such or in the form of paraformaldehyde is particularly preferred in this context.

The monomer components A, B, C and D (minus the water formed in the polycondensation reaction) are present in particular molar proportions in the polycondensation product of the invention. Thus the molar ratio of component C:(A+B) is preferably 1:3 to 3:1, more preferably 1:2 to 2:1 and more particularly 1:0.9 to 1:1.1.

The molar ratio of components A:B is preferably 1:10 to 10:1, more preferably 1:7 to 5:1 and more particularly 1:5 to 3:1. The molar ratio of components D:(A+B) is preferably 0 to 3:1, more preferably 0 to 2:1 and more particularly 0 to 1:1, with component D representing an optional component.

The polycondensation product of the invention is preferably in the form of a comb polymer with novolak structure. In other words, in the case of formaldehyde as the aldehyde component, the aromatic monomer components are joined to one another by means of —$CH_2$— groups, since, as observed later on below, the polycondensation reaction is carried out advantageously in the acidic range. This produces molecular weights for the polycondensation products that are situated preferably in the range from 1000 to 100 000, more preferably in the range from 2000 to 75 000 and more particularly in the range from 4000 to 50 000 g/mol.

The present invention further provides a process for preparing the polycondensation product of the invention, the said process being characterized in that components A), B), C) and optionally D) are subjected to polycondensation in aqueous solution at a temperature of 20 to 140° C. under a pressure of 1 to 10 bar.

If no sufficiently strong acid is used as monomer component B, C or D, it is advisable to use an acidic catalyst. As acidic catalyst it is possible to use an acid selected from the group consisting of sulphuric acid, methanesulphonic acid, p-toluenesulphonic acid, oxalic acid and phosphoric acid, and also mixtures thereof.

Following the reaction according to the invention, the reaction mixture may be subjected to an aftertreatment at a pH of 8.0 to 13.0, a temperature of 60 to 120° C. and preferably a pressure of 0.01 to 0.9 bar, more particularly in order to reduce the amount of unreacted, free aldehyde component.

The said pH can be set by addition of an aqueous alkali, such as NaOH, or a polyethyleneimine, and the salts formed during the neutralization are advantageously removed.

The present invention additionally provides for the use of the polycondensation products of the invention as dispersants for aqueous suspensions of inorganic binders selected from the group encompassing hydraulic binders, latent hydraulic binders, pozzolanic binders, alkali-activated aluminosilicate binders, and also mixtures thereof.

In this context, the said binders are advantageously selected from the following groups:
the hydraulic binders from cements, more particularly from Portland cement and aluminate cement, and also mixtures thereof,
the latent hydraulic binders from industrial and/or synthetic slags, more particularly from blast furnace slag, slag sand, ground slag sand, electrothermic phosphorus slag, stainless-steel slag, and also mixtures thereof,
and the pozzolanic binders from amorphous silica, preferably precipitated silica, pyrogenic silica and microsilica, finely ground glass, fly ash, preferably brown-coal fly ash and mineral coal fly ash, metakaolin, natural pozzolans such as tuff, trass and volcanic ash, natural and synthetic zeolites, and also mixtures thereof.

Portland cement contains about 70% by weight CaO+MgO, about 20% by weight $SiO_2$ and about 10% by weight $Al_2O_3+Fe_2O_3$. Aluminate cement ("high-alumina cement") contains about 20% to 40% by weight CaO, up to about 5% by weight $SiO_2$, about 40% to 80% by weight $Al_2O_3$ and up to about 20% by weight $Fe_2O_3$. These cements are well known in the art.

The slags may be both industrial slags, i.e. waste products from industrial processes, and synthetically reproduced slags. The latter is advantageous, since industrial slags are not always available in consistent quantity and quality.

For the purposes of the present invention, a latent hydraulic binder is preferably a binder in which the molar ratio of (CaO+MgO):$SiO_2$ is between 0.8 and 2.5 and more preferably between 1.0 and 2.0.

Blast furnace slag, a typical latent hydraulic binder, generally contains 30% to 45% by weight CaO, about 4% to 17% by weight MgO, about 30% to 45% by weight $SiO_2$ and about 5% to 15% by weight $Al_2O_3$, typically about 40% by weight CaO, about 10% by weight MgO, about 35% by weight $SiO_2$ and about 12% by weight $Al_2O_3$. The cured products generally have the properties of hydraulically cured systems.

Blast furnace slag is a waste product of the blast furnace process. Slag sand is granulated blast furnace slag, and ground slag sand ("ground granulated blast furnace slag") is finely pulverized slag sand. The ground slag sand varies, according to origin and processing form, in its particle size and grain-size distribution, with the particle size affecting the reactivity. As a characteristic variable for the particle size, the figure known as the Blaine value is employed, which is typically in the order of magnitude of 200 to 1000, preferably between 300 and 500 m² kg⁻¹. The finer the grind, the higher the reactivity.

Electrothermic phosphorus slag is a waste product from the production of phosphorus by electrothermic means. It is less reactive than blast furnace slag and contains about 45% to 50% by weight CaO, about 0.5% to 3% by weight MgO, about 38% to 43% by weight $SiO_2$, about 2% to 5% by weight $Al_2O_3$ and about 0.2% to 3% by weight $Fe_2O_3$, and also fluoride and phosphate. Stainless-steel slag is a waste product from various steel manufacturing processes, with a highly varying composition (see Caijun Shi, Pavel V. Krivenko, Della Roy, Alkali-Activated Cements and Concretes, Taylor & Francis, London & New York, 2006, pp. 42-51).

Amorphous silica is preferably an X-ray-amorphous silica, i.e. a silica which exhibits no crystallinity in a powder diffraction procedure. The amorphous silica of the invention advantageously has an $SiO_2$ content of at least 80% by weight, preferably at least 90% by weight. Precipitated silica is obtained industrially via precipitation processes starting from waterglass. Depending on the manufacturing method, precipitated silica is also called silica gel. Pyrogenic silica is generated by reacting chlorosilanes, such as silicon tetrachloride, in an oxyhydrogen flame. Pyrogenic silica is an amorphous $SiO_2$ powder with a particle diameter of 5 to 50 nm and a specific surface area of 50 to 600 m² g⁻¹.

Microsilica, also called silica dust, is a by-product of silicon or ferrosilicon manufacture and likewise consists very largely of amorphous $SiO_2$ powder. The particles have diameters in the order of magnitude of 0.1 µm. The specific surface area is in the order of magnitude of 15 to 30 m² g⁻¹. In contrast, commercial silica sand is crystalline and has comparatively large particles and a comparatively low specific surface area. In accordance with the invention it serves as an inert aggregate.

Fly ashes are formed in operations including the combustion of coal in power stations. Class C fly ash (brown coal fly ash) contains, according to WO 08/012438 about 10% by weight CaO, whereas class F fly ash (mineral coal fly ash) contains less than 8% by weight, preferably less than 4% by weight and typically about 2% by weight CaO.

Metakaolin is formed in the dehydrogenation of kaolin. Whereas kaolin gives off physically bound water at 100 to 200° C., dehydroxylation occurs at 500 to 800° C., with collapse of the lattice structure and formation of metakaolin ($Al_2Si_2O_7$). Pure metakaolin, accordingly, contains about 54% by weight $SiO_2$ and about 46% by weight $Al_2O_3$.

An overview of further pozzolanic binders suitable in accordance with the invention is found for example in Caijun Shi, Pavel V. Krivenko, Della Roy, Alkali-Activated Cements and Concretes, Taylor & Francis, London & New York, 2006, pp. 51-63. Testing for pozzolan activity can take place in accordance with DIN EN 196 Part 5.

According to one embodiment, therefore, the polycondensation product of the invention is suitable as a dispersant for alkali-activated aluminosilicate binders (geopolymers). According to another embodiment, it is suitable for dispersing mixed systems which comprise not only Portland cement but also geopolymer raw materials, such as microsilica, slags, fly ashes, clays, pozzolans or mixtures thereof (known as SCMs), i.e. for composite cements of categories CEM II-V and also CEM X. (Use as a dispersant for pure Portland cement or aluminate cement (CEM category I) is also possible, although not especially interesting from an economic standpoint.)

For the purposes of the present invention, "alkali-activated aluminosilicate binders" are binder systems which comprise latent hydraulic and/or pozzolanic binders as defined above and also alkaline activators, such as aqueous solutions of alkali metal carbonates, alkali metal fluorides, alkali metal hydroxides, alkali metal aluminates, alkali metal silicates (such as soluble waterglass) and/or mixtures thereof. Conversely, "alkali-activatable aluminosilicate binders" mean binder systems of the same kind which, although activatable by alkalis, have not yet been activated. In both cases, the amount of Portland cement and/or aluminate cement in total ought to be kept below 20% by weight, preferably below 10% by weight, in order to rule out hydraulic curing of the cement component. Furthermore, for the purposes of the present invention, the dry alkaline activator or the solids content of the aqueous alkaline activator is to be reckoned part of the inorganic binder. Furthermore, mixtures of dry alkaline activators and aqueous alkaline activators can also be used advantageously.

The said alkali metal silicate is advantageously selected from compounds having the empirical formula m $SiO_2$·n $M_2O$, where M stands for Li, Na, K and $NH_4$, and also mixtures thereof, preferably for Na and K. The molar ratio m:n is advantageously 0.5 to 4.0, preferably 0.6 to 3.0 and more particularly 0.7 to 2.5. The alkali metal silicate is preferably waterglass, more preferably a liquid waterglass, and more particularly a sodium or potassium waterglass. Use may also be made, however, of lithium or ammonium waterglasses, and also of mixtures of the stated waterglasses.

The above-specified ratio m:n (also called "modulus") ought preferably not to be exceeded, since otherwise it is no longer likely that there will be any complete reaction of the components. It is also possible to employ lower moduli, such as around 0.2. Waterglasses having higher moduli ought before use to be adjusted to moduli in the range according to the invention, using a suitable aqueous alkali metal hydroxide.

Potassium waterglasses in the advantageous modulus range are commercialized primarily as aqueous solutions, being highly hygroscopic; sodium waterglasses in the advantageous modulus range are also available commercially as solids. The solids contents of the aqueous waterglass solutions are generally 20% by weight to 60% by weight, preferably 30% to 50% by weight.

Waterglasses can be prepared industrially by melting silica sand with the corresponding alkali metal carbonates. Alternatively they may also be obtained without difficulty from mixtures of reactive silicas with the corresponding aqueous alkali metal hydroxides. In accordance with the invention, therefore, it is possible to replace at least part of the alkali metal silicate by a mixture of a reactive silica and the corresponding alkali metal hydroxide.

The polycondensation product of the invention can be used as a constituent of construction material formulations and/or construction material products such as on-site concrete, pre-cast concrete parts, concrete ware, cast concrete stones and also in-situ concrete, air-placed concrete, ready-mixed concrete, construction adhesives and adhesives for thermal insulation composite systems, concrete repair systems, one-component and two-component sealing slurries, screeds, filling and levelling compounds, tile adhesives, renders, adhesives and sealants, coating systems, more particularly for tunnels, wastewater channels, splash protection and condensate lines, dry mortars, joint grouts, drainage mortars and/or repair mortars.

In the case of cements in categories CEM I-V and also CEM X, the dispersants ought advantageously to be added in the range from 0.01% to 2.0%, preferably from 0.05% to 2.0%, by weight, based on the sum of the inorganic binders. (Not included in this reckoning are, for example, fillers and aggregates, such as sands and gravels, and also water and other possible additions).

Where the polycondensation product of the invention is used as a dispersant for alkali-activated aluminosilicate binders (geopolymers), nevertheless, the levels of addition ought to be higher, on account of the sometimes low metering efficiency. The level of addition of the dispersants here ought advantageously to be in the range from 0.01% to 10.0%, preferably from 0.02% to 5.0% and more particularly from 0.05% to 3.0%, by weight, based on the sum of the inorganic binders.

The present invention additionally provides for the use of the polycondensation products of the invention as grinding assistants for inorganic binders, selected from the group encompassing hydraulic binders, latent hydraulic binders and pozzolanic binders as defined above, and/or alkali-activatable aluminosilicate binders, and also mixtures thereof.

These grinding assistants facilitate the grinding of cements, such as Portland cement and aluminate cement, i.e. of cements of category CEM I, but also of composite cements of categories CEM II-V and CEM X, of latent hydraulic binders and pozzolanic binders, and also of alkali-activatable aluminosilicate binders, which, as defined above, comprise dry alkaline activators.

The level at which the grinding assistants are added here ought advantageously to be in the range from 0.005% to 0.30%, preferably from 0.01% to 0.05%, by weight, based on the sum of the inorganic binders.

The grinding assistants and dispersants of the invention may be used together with further additions or auxiliaries, selected from the group encompassing glycols, polyalcohols, amine alcohols, organic acids, amino acids, sugars, molasses, organic and inorganic salts, polycarboxylate ethers, naphthalenesulphonate, melamine-formaldehyde polycondensation products, lignosulphonate, and also mixtures thereof. Further additives contemplated include defoamers, water retention agents, pigments, fibres, dispersion powders, wetting agents, retardants, accelerants, such as calcium silicate hydrate, complexing agents, aqueous dispersions and rheology modifiers.

Particularly noteworthy in this context is that when the dispersants of the invention are used in combination with commercial polycarboxylate ethers, the hydration of the composite cement is significantly quicker in the case of approximately the same metering efficiency.

BRIEF DESCRIPTION OF THE DRAWINGS

The present invention is now elucidated with greater precision by means of the examples below and the appended drawings. In the drawing.

EXAMPLES

Example 1

Figure 1:
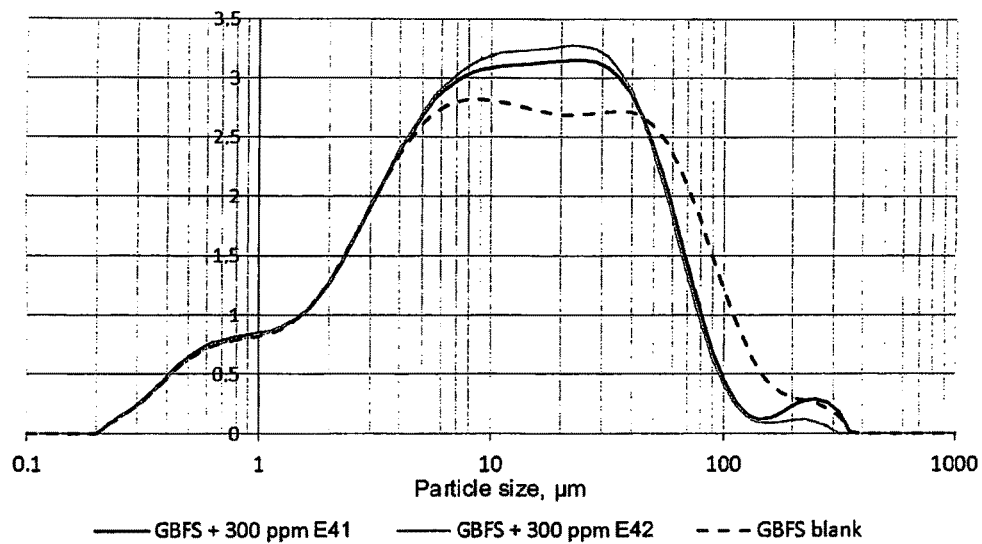
FIG. 1 shows a graphic representation of the particle size distributions of ground slag sand as a function of the grinding assistant used during cold grinding.

A heatable reactor equipped with stirrer and metering pump is charged under nitrogen at 90° C. with 320 parts of poly(ethylene oxide) monophenyl ether (average molecular weight 2000 g/mol), 49 parts of 3,4-dihydroxybenzoic acid and 16 parts of paraformaldehyde. The reaction mixture is heated with stirring to 110° C. until all of the solids have dissolved, and then 44 parts of methanesulphonic acid (70% strength—here and in all subsequent syntheses, in the form of an aqueous solution) are added over the course of 20 minutes at a rate such that the reaction temperature does not exceed 115° C. After the end of metering, the reaction mixture is stirred at 110° C. for a further 3 hours. It is then left to cool, admixed with 350 parts of water, heated to 100° C. for 30 minutes and neutralized to a pH of about 7.0 using 50% strength aqueous sodium hydroxide solution.

Example 2

A heatable reactor equipped with stirrer and metering pump is charged under nitrogen at 90° C. with 300 parts of poly(ethylene oxide) monophenyl ether (average molecular weight 2000 g/mol), 46 parts of vanillin (>99%, 4-hydroxy-3-methoxybenzaldehyde) and 14.9 parts of paraformaldehyde. The reaction mixture is heated with stirring to 110° C., and then 51.4 parts of methanesulphonic acid (70%) are added over the course of 20 minutes at a rate such that the reaction temperature does not exceed 115° C. After the end of metering, the reaction mixture is stirred at 110° C. for a further 2.5 hours. It is then left to cool, admixed with 350 parts of water, heated to 100° C. for 30 minutes and neutralized to a pH of about 7.0 using 50% strength aqueous sodium hydroxide solution.

Example 3

A heatable reactor equipped with stirrer and metering pump is charged under nitrogen at 90° C. with 400 parts of poly(ethylene oxide) monophenyl ether (average molecular weight 5000 g/mol), 24.6 parts of 3,4-dihydroxybenzoic acid and 8 parts of paraformaldehyde. The reaction mixture is heated with stirring to 115° C., and then 38.4 parts of methanesulphonic acid (70%) are added over the course of 10 minutes at a rate such that the reaction temperature does not exceed 115° C. After the end of metering, the reaction mixture is stirred at 110° C. for a further 3 hours. It is then left to cool, admixed with 400 parts of water, heated to 100° C. for 30 minutes and neutralized to a pH of about 7.0 using 50% strength aqueous sodium hydroxide solution.

Example 4

A heatable reactor equipped with stirrer and metering pump is charged under nitrogen at 80° C. with 260 parts of poly(ethylene oxide) monophenyl ether (average molecular weight 2000 g/mol), 43 parts of pyrocatechol (1,2-dihydroxybenzene), 80 parts of water and 15.6 parts of paraformaldehyde. The reaction mixture is subsequently admixed with 12.5 parts of methanesulphonic acid (50%) over the course of 20 minutes at a rate such that the temperature does not exceed 80° C. After the end of metering, the reaction mixture is stirred at 80° C. for a further 2 hours. It is then left to cool, admixed with 350 parts of water and neutralized to a pH of about 7.0 using 50% strength aqueous sodium hydroxide solution.

Example 5

A heatable reactor equipped with stirrer and metering pump is charged under nitrogen at 90° C. with 300 parts of poly(ethylene oxide) monophenyl ether (average molecular weight 2000 g/mol), 46.2 parts of 3,4-dihydroxybenzoic acid, 33 parts of 2-phenoxyethyl phosphate and 19.9 parts of paraformaldehyde. The reaction mixture is heated with stirring to 110° C., and then 41 parts of methanesulphonic acid (70%) are added over the course of 25 minutes at a rate such that the reaction temperature does not exceed 115° C. After the end of metering, the reaction mixture is stirred at 110° C. for a further 2.5 hours. It is then left to cool, admixed with 350 parts of water, heated to 100° C. for 30 minutes and neutralized to a pH of about 7.0 using 50% strength aqueous sodium hydroxide solution.

The said 2-phenoxyethyl phosphate is synthesized generally by charging a heatable reactor, equipped with stirrer and metering pump, under nitrogen at 20° C. with 621.8 parts of 2-phenoxyethanol. Subsequently, with cooling, 449.7 parts of polyphosphoric acid are added over 100 minutes at a rate such that the temperature does not rise above 35° C. After the end of metering, the reaction mixture is stirred at about 70° C. for a further 15 minutes and is discharged prior to solidification.

Example 6

A heatable reactor equipped with stirrer and metering pump is charged under nitrogen at 90° C. with 300 parts of poly(ethylene oxide) monophenyl ether (average molecular weight 2000 g/mol), 45.7 parts of vanillin (>99%, 4-hydroxy-3-methoxybenzaldehyde), 32.7 parts of 2-phenoxyethyl phosphate and 19.9 parts of paraformaldehyde. The reaction mixture is heated with stirring to 110° C., and then 41.1 parts of methanesulphonic acid (70%) are added over the course of 20 minutes at a rate such that the reaction temperature does not exceed 115° C. After the end of metering, the reaction mixture is stirred at 110° C. for a further 2.5 hours. It is then left to cool, admixed with 350 parts of water, heated to 100° C. for 30 minutes and neutralized to a pH of about 7.0 using 50% strength aqueous sodium hydroxide solution.

Example 7

A heatable reactor equipped with stirrer and metering pump is charged under nitrogen at 90° C. with 300 parts of poly(ethylene oxide) monophenyl ether (average molecular weight 2000 g/mol), 45.6 parts of isovanillin (3-hydroxy-4-methoxybenzaldehyde), 33 parts of 2-phenoxyethyl phosphate and 19.9 parts of paraformaldehyde. The reaction mixture is heated with stirring to 110° C., and then 41 parts of methanesulphonic acid (70%) are added over the course of 20 minutes at a rate such that the reaction temperature does not exceed 115° C. After the end of metering, the reaction mixture is stirred at 110° C. for a further 2 hours. It is then left to cool, admixed with 350 parts of water, heated to 100° C. for 30 minutes and neutralized to a pH of about 7.0 using 50% strength aqueous sodium hydroxide solution.

Example 8

A heatable reactor equipped with stirrer and metering pump is charged under nitrogen at 80° C. with 300 parts of poly(ethylene oxide) monophenyl ether (average molecular weight 2000 g/mol), 72.1 parts of 2,3-dihydroxynaphthalene and 18.0 parts of paraformaldehyde. The reaction mixture is subsequently admixed with 12.5 parts of methanesulphonic acid (50%) over the course of 30 minutes at a rate such that the reaction temperature does not exceed 80° C. After the end of metering, the reaction mixture is stirred at 80° C. for a further 75 minutes. It is then left to cool, admixed with 350 parts of water and neutralized to a pH of about 7.0 using 50% strength aqueous sodium hydroxide solution.

Example 9

A heatable reactor equipped with stirrer and metering pump is charged with 225 parts of poly(ethylene oxide) monophenyl ether (average molecular weight 750 g/mol) and 41.5 parts of 2-phenoxyethanol. Subsequently, with cooling, 66.0 parts of polyphosphoric acid are added over 30 minutes and the mixture is stirred at 90-95° C. for 60 minutes. Added to this reaction mixture at 90° C. under a stream of nitrogen are 92.5 parts of 3,4-dihydroxybenzoic acid and 39.8 parts of paraformaldehyde. The reaction mixture is heated to about 100° C. with stirring, and then 57.6 parts of methanesulphonic acid (70%) are added over the course of 25 minutes at a rate such that the reaction temperature does not exceed 105° C. After the end of metering, the reaction mixture is stirred at 100° C. for a further 15 minutes. It is then left to cool, admixed with 350 parts of water and neutralized to a pH of about 7.0 using 50% strength aqueous sodium hydroxide solution.

Example 10

A heatable reactor equipped with stirrer and metering pump is charged with 225 parts of poly(ethylene oxide) monophenyl ether (average molecular weight 750 g/mol) and 82.9 parts of 2-phenoxyethanol. Subsequently, with cooling, 99.0 parts of polyphosphoric acid are added over 20 minutes and the mixture is stirred at 90-95° C. for 40 minutes. Added to this reaction mixture at 90° C. under a stream of nitrogen are 46.2 parts of 3,4-dihydroxybenzoic acid and 39.8 parts of paraformaldehyde. The reaction mixture is heated to about 100° C. with stirring and then 57.6 parts of methanesulphonic acid (70%) are added over the course of 25 minutes at a rate such that the reaction temperature does not exceed 105° C. After the end of metering, the reaction mixture is stirred at 100° C. for a further 15 minutes. It is then left to cool, admixed with 350 parts of water and neutralized to a pH of about 7.0 using polyethyleneimine (Lupasol® G100, BASF SE).

Example 11

Aluminosilicate mortars were produced in accordance with the following formula:

| | |
|---|---|
| Microsilica | 150 g |
| Fly ash, type F | 150 g |
| Silica sand | 700 g |
| KOH (0.2%) | 250 g |

The starting materials were mixed in the laboratory with a mortar mixer in accordance with DIN EN 196-1. The mixing operation was carried out as described in DIN EN 196-1, with the difference that the silica sand was added right at the beginning, and not only subsequently, to the mixing trough. The alkaline activator used was a 0.2% strength by weight aqueous KOH solution. All of the polymeric dispersants were defoamed using Defoamer DF93 from BASF SE or triisobutyl phosphate.

The dispersant was used as an aqueous solution as obtained in the examples above. The level of addition in each case was 3 g (calculated as solid). For comparison, determinations were made of the slump without additive and with in each case 3 g of the polycarboxylate ethers Melflux® 2453 (Comparative Example 1), Glenium 51 (Comparative Example 2) and Melflux PCE 26L (Comparative Example 3), all available from BASF SE.

The compositions of the ground slag sand and type F fly ash were as follows [% by weight]:

|  | $SiO_2$ | $Fe_2O_3$ | $TiO_2$ | $Al_2O_3$ | CaO | MgO | $K_2O$ | remainder |
|---|---|---|---|---|---|---|---|---|
| Slag sand | 34.0 | 0.4 | 1.1 | 11.6 | 43.0 | 7.3 | 0.5 | 2.1 |
| Fly ash | 53.4 | 5.7 | 1.1 | 26.8 | 3.1 | 2.0 | 4.5 | 3.4 |

The slump was determined in each case by tapping 15 times on a slump table with a Hägermann cone (DIN EN 1015-3). The results are shown in Table 1.

TABLE 1

| Example | Slump [cm] | Density [g/cm³] |
|---|---|---|
| Without additive | 19.9 | 1.94 |
| Comparative Example 1 | 18.4 | 1.83 |
| Comparative Example 2 | 18.9 | 1.95 |
| Example 5 | 24.3 | 1.83 |
| Example 6 | >30.0 | 1.85 |
| Example 7 | >30.0 | 1.79 |

Example 12

Example 11 was repeated with the modification that 5.0% strength by weight aqueous KOH solution was used as activator. The results are shown in Table 2.

Formula:

| Microsilica | 150 g |
|---|---|
| Fly ash, type F | 150 g |
| Silica sand | 700 g |
| KOH (5.0%) | 262.63 g |

TABLE 2

| Example | Slump [cm] | Density [g/cm3] |
|---|---|---|
| Without additive | 17.5 | 1.96 |
| Comparative Example 1 | 19.1 | 1.83 |
| Comparative Example 2 | 19.0 | 1.98 |
| Example 1 | 28.4 | 1.96 |
| Example 3 | 23.0 | 1.91 |
| Example 5 | >30.0 | 1.93 |

Example 13

Example 11 was repeated with the modification that ground slag sand was used in the formulation. The results are shown in Table 3.

Formula:

| Ground slag sand | 300 g |
|---|---|
| Silica sand | 700 g |
| KOH (0.2%) | 250 g |

TABLE 3

| Example | Slump [cm] | Density [g/cm3] |
|---|---|---|
| Without additive | 17.1 | 2.11 |
| Comparative Example 1 | 22.7 | 2.00 |
| Example 3 | 25.4 | 2.02 |

TABLE 3-continued

| Example | Slump [cm] | Density [g/cm3] |
|---|---|---|
| Example 5 | 25.8 | 2.03 |
| Example 6 | >30.0 | 2.05 |
| Example 7 | >30.0 | 2.13 |
| Example 8 | 28.2 | 2.06 |

Example 14

Example 13 was repeated with the modification that 5.0% strength by weight aqueous KOH solution was used as activator. The results are shown in Table 4.

Formula:

| Ground slag sand | 300 g |
|---|---|
| Silica sand | 700 g |
| KOH (5.0%) | 189.09 g |

TABLE 4

| Example | Slump [cm] | Density [g/cm3] |
|---|---|---|
| Without additive | 17.4 | 2.12 |
| Comparative Example 1 | 17.9 | 1.86 |
| Comparative Example 2 | 21.5 | 2.11 |
| Example 1 | 28.4 | 2.09 |
| Example 3 | 28.1 | 2.05 |
| Example 5 | >30.0 | 2.10 |
| Example 6 | >30.0 | 2.07 |
| Example 7 | >30.0 | 2.08 |

Example 15

Example 14 was repeated with the modification that a 3.3% strength by weight aqueous $Na_2CO_3$ solution was used as activator. The slump [in cm] was determined after 6 minutes and 30 minutes. The results are shown in Table 5.

Formula:

| | |
|---|---|
| Ground slag sand | 300 g |
| Silica sand | 700 g |
| Na₂CO₃ (3.3%) | 181 g |

TABLE 5

| Example | Slump (6 min) | Slump (30 min) | Density [g/cm3] |
|---|---|---|---|
| Without additive | 17.5 | 16.6 | 2.00 |
| Comparative Example 3 | 17.8 | 17.0 | 2.03 |
| Example 9 | 20.4 | 19.9 | 2.01 |
| Example 10 | 19.7 | 18.8 | 1.99 |

Example 16

Example 15 was repeated with the modification that a 3.3% strength by weight aqueous Na₂SiO₃ solution was used as activator. The slump [in cm] was determined after 6 minutes and 30 minutes. The results are shown in Table 6.
Formula:

| | |
|---|---|
| Ground slag sand | 300 g |
| Silica sand | 700 g |
| Na₂SiO₃ (3.3%) | 181 g |

TABLE 6

| Example | Slump (6 min) | Slump (30 min) | Density [g/cm3] |
|---|---|---|---|
| Without additive | 17.6 | 16.1 | 1.99 |
| Comparative Example 3 | 18.3 | 16.2 | 2.00 |
| Example 9 | 20.0 | 19.0 | 1.97 |
| Example 10 | 19.6 | 18.7 | 1.96 |

As becomes clear from these performance tests, the polymers of the invention enable a distinct improvement in the consistency of the aluminosilicate mortars in comparison to the sample without dispersants. In some cases the flow of the mortar mixtures, as a result of the addition of the polymers of the invention, exceeds the dimensions of the 30 cm tapping board. A plasticizing performance can be achieved here in different binding compositions and with different activators such as KOH, Na₂CO₃ or waterglass. Moreover, it can be seen that in contrast to the polycarboxylate ethers, the plasticizing of alkali-activated aluminosilicate binders is possible with the polymers of the invention.

Example 17

A heatable reactor equipped with stirrer and metering pump is charged under nitrogen at 90° C. with 320 parts of poly(ethylene oxide) monophenyl ether (average molecular weight 2000 g/mol), 44.2 parts of salicylic acid and 15.9 parts of paraformaldehyde. The reaction mixture is heated with stirring to 110° C. until all of the solids have dissolved, and then 66 parts of methanesulphonic acid (70%) are added over the course of 15 minutes at a rate such that the reaction temperature does not exceed 110° C. After the end of metering, the reaction mixture is stirred at 110° C. for a further 4 hours. It is then left to cool, admixed with 350 parts of water, heated to 100° C. for 30 minutes and neutralized to a pH of about 7.0 using 50% strength aqueous sodium hydroxide solution.

Example 18

A heatable reactor equipped with stirrer and metering pump is charged under nitrogen at 90° C. with 320 parts of poly(ethylene oxide) monophenyl ether (average molecular weight 2000 g/mol), 44.2 parts of salicylic acid, 35 parts of 2-phenoxyethyl phosphate and 21.2 parts of paraformaldehyde. The reaction mixture is heated with stirring to 110° C. and then 44 parts of methanesulphonic acid (70%) are added over the course of 15 minutes at a rate such that the reaction temperature does not exceed 115° C. After the end of metering, the reaction mixture is stirred at 110° C. for a further 2.75 hours. It is then left to cool, admixed with 350 parts of water, heated to 100° C. for 30 minutes and neutralized to a pH of about 7.0 using 50% strength aqueous sodium hydroxide solution.

Example 19

A heatable reactor equipped with stirrer and metering pump is charged under nitrogen at 90° C. with 225 parts of poly(ethylene oxide) monophenyl ether (average molecular weight 750 g/mol), 82.9 parts of salicylic acid, 65.4 parts of 2-phenoxyethyl phosphate, 25 parts of water and 39.8 parts of paraformaldehyde. The reaction mixture is heated with stirring to 100° C. and then 115.2 parts of methanesulphonic acid (50%) are added over the course of 40 minutes at a rate such that the reaction temperature does not exceed 105° C. After the end of metering, the reaction mixture is stirred at 105° C. for a further 4 hours. It is then left to cool, admixed with 400 parts of water and neutralized to a pH of about 7.0 using 50% strength aqueous sodium hydroxide solution.

Example 20

A heatable reactor equipped with stirrer and metering pump is charged under nitrogen at 90° C. with 225 parts of poly(ethylene oxide) monophenyl ether (average molecular weight 750 g/mol), 165.7 parts of salicylic acid and 48.4 parts of paraformaldehyde. The reaction mixture is heated with stirring to 95° C. and then 57.6 parts of methanesulphonic acid (50%) are added over the course of 25 minutes at a rate such that the reaction temperature does not exceed 115° C. After the end of metering, the reaction mixture is stirred at 105° C. for a further 90 minutes. It is then left to cool, admixed with 300 parts of water and neutralized to a pH of about 7.0 using 50% strength aqueous sodium hydroxide solution.

Example 21

A heatable reactor equipped with stirrer and metering pump is charged under nitrogen at 90° C. with 225 parts of poly(ethylene oxide) monophenyl ether (average molecular weight 750 g/mol), 82.9 parts of salicylic acid, 65.4 parts of 2-phenoxyethyl phosphate and 127.6 parts of formalin (30% strength in H₂O). The reaction mixture is heated with stirring to 100° C. and then 85.2 parts of sulphuric acid (70%) are added over the course of 20 minutes at a rate such that the reaction temperature does not exceed 105° C. After the end of metering, the reaction mixture is stirred at 105° C. for a further 3 hours. It is then left to cool, admixed with 300 parts of water, heated to 100° C. for 30 minutes and neutralized to a pH of about 7.0 using 50% strength aqueous sodium hydroxide solution.

Example 22

A heatable reactor equipped with stirrer and metering pump is charged under nitrogen at 90° C. with 320 parts of poly(ethylene oxide) monophenyl ether (average molecular weight 2000 g/mol), 44.2 parts of salicylic acid, 22.1 parts of 2-phenoxyethanol and 21.2 parts of paraformaldehyde. Added to the reaction mixture then are 43.9 parts of methanesulphonic acid (70%) over the course of 15 minutes at a rate such that the reaction temperature does not exceed 110° C. After the end of metering, the reaction mixture is stirred at 110° C. for a further 1 hour. It is then left to cool, admixed with 350 parts of water, heated to 100° C. for 30 minutes and neutralized to a pH of about 7.0 using 50% strength aqueous sodium hydroxide solution.

Example 23

A heatable reactor equipped with stirrer and metering pump is charged under nitrogen at 95° C. with 225 parts of poly(ethylene oxide) monophenyl ether (average molecular weight 750 g/mol), 82.9 parts of salicylic acid, 65.4 parts of 2-phenoxyethyl phosphate and 82.3 parts of methanesulphonic acid (70%). The reaction mixture is heated with stirring to about 105° C. and then 128.2 parts of formalin (30% strength) are added over the course of 70 minutes at a rate such that the reaction temperature does not exceed 110° C. After the end of metering, the reaction mixture is stirred at 100° C. for a further 4.75 hours. It is then left to cool, admixed with 300 parts of water and neutralized to a pH of about 7.0 using 50% strength aqueous sodium hydroxide solution.

Example 24

A heatable reactor equipped with stirrer and metering pump is charged with 263 parts of poly(ethylene oxide) monophenyl ether (average molecular weight 750 g/mol) and conditioned to 30° C. Then, over the course of 20 minutes, 42 parts of polyphosphoric acid are added, followed by subsequent reaction for 15 minutes. This reaction mixture is admixed with 96.7 parts of salicylic acid, 76.4 parts of 2-phenoxyethyl phosphate, 50 parts of water and 46.5 parts of paraformaldehyde under nitrogen at 95° C. The reaction mixture is heated to about 105° C. with stirring, and in this stage 66.2 parts of methanesulphonic acid (70%) are added over the course of 30 minutes at a rate such that the reaction temperature does not exceed 110° C. After the end of metering, the reaction mixture is stirred at 105° C. for a further 3.25 hours. It is then left to cool, admixed with 300 parts of water and neutralized to a pH of about 7.0 using 50% strength aqueous sodium hydroxide solution.

Example 25

Example 12 was repeated with the salicylic acid-containing polymers of Examples 19 to 24. The results are shown in Table 7.

Formulation:

| Microsilica | 150 g |
| Fly ash, type F | 150 g |
| Silica sand | 700 g |
| KOH (5.0%) | 262.63 g |

TABLE 7

| Example | Slump [cm] | Density [g/cm3] |
| --- | --- | --- |
| Without additive | 17.5 | 1.95 |
| Comparative Example 1 | 19.1 | 1.83 |
| Comparative Example 2 | 19.0 | 1.98 |
| Example 19 | 23.5 | 1.95 |
| Example 21 | ≥30.0 | 1.92 |
| Example 23 | ≥30.0 | 1.91 |
| Example 24 | 27.3 | 1.94 |

Example 26

Example 25 was repeated with the modification that 0.2% strength by weight aqueous KOH solution was used as activator. The results are shown in Table 8.

Formulation:

| Microsilica | 150 g |
| Fly ash, type F | 150 g |
| Silica sand | 700 g |
| KOH (0.2%) | 250 g |

TABLE 8

| Example | Slump [cm] | Density [g/cm3] |
| --- | --- | --- |
| Without additive | 19.9 | 1.94 |
| Comparative Example 1 | 18.4 | 1.83 |
| Comparative Example 2 | 18.9 | 1.95 |
| Example 18 | 23.6 | 1.83 |
| Example 19 | 25.4 | 1.85 |
| Example 23 | 25.8 | 1.85 |
| Example 24 | ≥30.0 | 1.97 |

Example 27

Example 13 was repeated with the salicylic acid-containing polymers of Examples 17 to 24. The results are shown in Table 9.

Formulation:

| Ground slag sand | 300 g |
| Silica sand | 700 g |
| KOH (0.2%) | 180 g |

TABLE 9

| Example | Slump [cm] | Density [g/cm3] |
| --- | --- | --- |
| Without additive | 17.1 | 2.11 |
| Comparative Example 1 | 22.7 | 2.00 |
| Example 17 | 25.4 | 2.05 |
| Example 18 | ≥30.0 | 2.11 |
| Example 19 | 29.3 | 2.05 |
| Example 22 | 22.9 | 1.88 |

TABLE 9-continued

| Example | Slump [cm] | Density [g/cm3] |
|---|---|---|
| Example 23 | 28.5 | 2.01 |
| Example 24 | 24.7 | 2.12 |

Example 28

Example 27 was repeated with the modification that 5.0% strength by weight aqueous KOH solution was used as activator. The results are shown in Table 10.

Formulation:

| | |
|---|---|
| Ground slag sand | 300 g |
| Silica sand | 700 g |
| KOH (5.0%) | 189.09 g |

TABLE 10

| Example | Slump [cm] | Density [g/cm3] |
|---|---|---|
| Without additive | 17.4 | 2.12 |
| Comparative Example 1 | 17.9 | 1.86 |
| Comparative Example 2 | 21.5 | 2.11 |
| Example 17 | 28.4 | 2.09 |
| Example 18 | ≥30.0 | 2.13 |
| Example 19 | ≥30.0 | 2.09 |
| Example 21 | ≥30.0 | 2.06 |
| Example 22 | ≥30.0 | 2.00 |
| Example 23 | ≥30.0 | 2.08 |
| Example 24 | 29.3 | 2.07 |

Example 29

Example 28 was repeated with the modification that 15.0% strength by weight aqueous KOH solution was used as activator. The results are shown in Table 11.

Formulation:

| | |
|---|---|
| Ground slag sand | 300 g |
| Silica sand | 700 g |
| KOH (15%) | 211.34 g |

TABLE 11

| Example | Slump [cm] | Density [g/cm3] |
|---|---|---|
| Without additive | 18.6 | 2.07 |
| Comparative Example 1 | 19.7 | 1.85 |
| Comparative Example 2 | 19.4 | 2.05 |
| Example 19 | 23.7 | 2.11 |
| Example 21 | 27.4 | 2.09 |
| Example 24 | ≥30.0 | 2.11 |

As these examples show, the polymers of the invention enable a significant improvement in the consistency of the aluminosilicate mortars. Here, the polymers of the invention permit an improvement in the consistency of geopolymer systems with different binder compositions, such as fly ashes, microsilica or ground slag sands, and with different activator solutions. Moreover, it can be seen from the tests that standard plasticizers such as polycarboxylic ethers exhibit virtually no effect, whereas the polymers of the invention enable outstanding plasticization and hence water reduction.

Example 30

A heatable reactor equipped with stirrer and metering pump is charged with 262.5 parts of poly(ethylene oxide) monophenyl ether (average molecular weight 750 g/mol) and 48.4 parts of 2-phenoxyethanol. Subsequently, with cooling, 77.0 parts of polyphosphoric acid are added over 15 minutes and the mixture is stirred at about 95° C. for 45 minutes. Added to this reaction mixture at about 90° C. under a stream of nitrogen are 96.7 parts of salicylic acid, 50 parts of water and 46.5 parts of paraformaldehyde. The reaction mixture is heated to about 90° C. with stirring and then 67.3 parts of methanesulphonic acid (70%) are added over the course of 30 minutes at a rate such that the reaction temperature does not exceed 110° C. After the end of metering, the reaction mixture is stirred at about 100° C. for a further 120 minutes. It is then left to cool, admixed with 350 parts of water and neutralized to a pH of about 7.0 using aqueous sodium hydroxide solution (50%). The neutralized dispersant is in the form of an about 35.0% strength by weight aqueous solution.

Example 31

A heatable reactor equipped with stirrer and metering pump is charged with 225 parts of poly(ethylene oxide) monophenyl ether (average molecular weight 750 g/mol) and 82.9 parts of 2-phenoxyethanol. Subsequently, with cooling, 99.0 parts of polyphosphoric acid are added over 35 minutes and the mixture is stirred at about 90-95° C. for 60 minutes. Added to this reaction mixture under a stream of nitrogen are 41.4 parts of salicylic acid, 40 parts of water and 39.8 parts of paraformaldehyde. The reaction mixture is heated to about 85° C. with stirring and then 57.7 parts of methanesulphonic acid (70%) are added over the course of 35 minutes at a rate such that the reaction temperature does not exceed 105° C. After the end of metering, the reaction mixture is stirred at 100° C. for a further 140 minutes. It is then left to cool, admixed with 350 parts of water and neutralized to a pH of about 7.0 using polyethyleneimine (Lupasol® G100 from BASF SE). The neutralized dispersant is in the form of an about 30.4% strength by weight aqueous solution.

Example 32

Aluminosilicate mortars were produced in accordance with the following formula:

| | |
|---|---|
| Microsilica | 150 g |
| Fly ash, type F | 150 g |
| Silica sand | 700 g |
| $Na_2Al_2O_4$ | 15 g |
| Defoamer | 0.12 g |
| Water, total | 250 g |

The starting materials were mixed in the laboratory with a mortar mixer in accordance with DIN EN 196-1. The mixing operation was carried out as described in DIN EN 196-1, with the difference that the silica sand was added right at the beginning, and not only subsequently, to the mixing trough. The alkaline activator used was the sodium aluminate dissolved in the make-up water. As the defoamer, the product Defoamer DF40 from BASF SE was used. The dispersant was used as an aqueous solution as obtained in Examples 1 and 2 (indicated as polymer solids content).

The compositions of the type F fly ash and the microsilica were as follows [% by weight]:

|  | SiO$_2$ | Fe$_2$O$_3$ | TiO$_2$ | Al$_2$O$_3$ | CaO | MgO | K$_2$O | Remainder |
|---|---|---|---|---|---|---|---|---|
| Fly ash | 53.4 | 5.7 | 1.1 | 26.8 | 3.1 | 2.0 | 4.5 | 3.4 |
| Microsilica | 98.1 | 0.0 | 0.0 | 0.0 | 0.23 | 0.2 | 0.77 | 0.7 |

The slump was determined after 6 minutes in each case by tapping 15 times on a slump table with a Hägermann cone (DIN EN 1015-3). The results are shown in Table 12.

TABLE 12

|  | Reference | Example 30 | Example 31 |
|---|---|---|---|
| Dispersant | 0.0 g | 3.0 g | 3.0 g |
| Slump | 18.6 cm | 27.5 cm | 27.3 cm |

This table shows that the dispersants of the invention also enable a significant improvement in the slumps of the aluminosilicate mortar mixtures when in combination with sodium aluminate as alkaline activator. Here, an improvement in consistency is obtained both by Na salts and by polyethyleneimine salts of the polymers of the invention.

Example 33

Example 3 was repeated. A fully water-soluble, brown polymer was obtained which had a molecular weight (max. peak) Mp=24.3 kDa (column combinations: OH-Pak SB-G, OH-Pak SB 804 HQ and OH-Pak SB 802.5 HQ from Shodex, Japan; eluent: 80% by volume aqueous ammonium formate solution (0.05 mol/l) and 20% by volume acetonitrile; injection volume 100 μl; flow rate 0.5 ml/min).

Example 34

A heatable reactor equipped with stirrer, reflux condenser and metering pump is charged with 150 parts of poly (ethylene oxide) monophenyl ether (average molecular weight 750 g/mol), 101 parts of hydroquinone bis(2-hydroxyethyl) ether and 28 parts of salicylic acid and heated to 90° C. under nitrogen. Then 132 parts of polyphosphoric acid are added over the course of 33 minutes, followed by subsequent reaction for 10 minutes. This reaction mixture is admixed with 48 parts of methanesulphonic acid (70%) and 2 parts of water at 98° C. The reaction mixture is cooled to about 90° C., with stirring, and 95 parts of formalin solution (30%) are added over the course of 50 minutes at a rate such that the reaction temperature does not exceed 110° C. After the end of metering, the reaction mixture is stirred at 100° C. for a further 20 minutes. It is then left to cool, admixed with 760 parts of water and neutralized to a pH of about 7.3 using 50% strength aqueous sodium hydroxide solution.

Example 35

A heatable reactor equipped with stirrer, reflux condenser and metering pump is charged with 188 parts of poly (ethylene oxide) monophenyl ether (average molecular weight 750 g/mol) and parts of phenoxyethanol and heated to 25° C. under nitrogen. Then 55 parts of polyphosphoric acid are added over the course of 8 minutes, after which the reaction mixture is heated to 92° C. and subsequently reacted at this temperature for 100 minutes. The reaction mixture is admixed with 104 parts of salicylic acid and 69 parts of methanesulphonic acid (70%) and, after 10 minutes, 131 parts of formalin solution (30%) are added over the course of 60 minutes at a rate such that the reaction temperature does not exceed 110° C. After the end of metering, the reaction mixture is stirred at 100° C. for a further 3.5 hours. It is then left to cool, admixed with 500 parts of water and neutralized to a pH of about 7.3 using 50% strength aqueous sodium hydroxide solution.

Example 36

A heatable reactor equipped with stirrer, reflux condenser and metering pump is charged with 188 parts of poly (ethylene oxide) monophenyl ether (average molecular weight 750 g/mol), and additionally 28 parts of polyphosphoric acid are added under nitrogen over the course of 8 minutes. After 10 minutes from the end of metering, the reaction mixture is heated to 90° C. with stirring and subsequently reacted at around 95° C. for 4 hours. Then 35 parts of phenoxyethanol and, 30 minutes later, 104 parts of salicylic acid and 69 parts of methanesulphonic acid (70%) are added. The reaction mixture is heated to around 100° C. with stirring, and when that temperature has been attained, 132 parts of formalin solution (30%) are added over the course of 50 minutes at a rate such that the reaction temperature does not exceed 110° C. After the end of metering, the reaction mixture is stirred at 95° C. for a further 3.7 hours. It is then left to cool, admixed with 450 parts of water and neutralized to a pH of about 7.3 using 50% strength aqueous sodium hydroxide solution.

Example 37

A heatable reactor equipped with stirrer, reflux condenser and metering pump is charged with 135 parts of poly (ethylene oxide) monophenyl ether (average molecular weight 750 g/mol), and additionally 20 parts of polyphosphoric acid are added under nitrogen over the course of 6 minutes. After 10 minutes from the end of metering, the reaction mixture is heated to 90° C. with stirring and subsequently reacted at around 95° C. for 4 hours. Then 50 parts of phenoxyethanol and, 15 minutes later, 149 parts of salicylic acid and 99 parts of methanesulphonic acid (70%) are added. The reaction mixture is heated to around 90° C. with stirring, and when that temperature has been attained, 170 parts of formalin solution (30%) are added over the course of 60 minutes at a rate such that the reaction temperature does not exceed 110° C. After the end of metering, the reaction mixture is stirred at 95° C. for a further 2.75 hours. It is then left to cool, admixed with 500 parts of water and neutralized to a pH of about 7.3 using 50% strength aqueous sodium hydroxide solution.

Example 38

Aluminosilicate mortars were produced in accordance with the following formula:

| | |
|---|---|
| Ground slag sand | 300 g |
| Silica sand | 700 g |
| KOH | 12 g |
| Na$_2$CO$_3$ | 12 g |
| Defoamer | 0.12 g |
| Water, total | 175 g |

The starting materials were mixed in the laboratory with a mortar mixer in accordance with DIN EN 196-1. The mixing operation was carried out as described in DIN EN 196-1, with the difference that the silica sand was added right at the beginning, and not only subsequently, to the mixing trough. The alkaline activator used was the potassium hydroxide and sodium carbonate dissolved in the make-up water. As the defoamer, the product Defoamer DF93 from BASF SE was used. The dispersant was used as an aqueous solution as obtained in Examples 1 and 2 (polymer solids content in the mortar mixture: 3 g).

The composition of the ground slag sand was as follows [% by weight]:

| | SiO$_2$ | Fe$_2$O$_3$ | TiO$_2$ | Al$_2$O$_3$ | CaO | MgO | K$_2$O | Remainder |
|---|---|---|---|---|---|---|---|---|
| Slag sand | 33.1 | 0.6 | 0.6 | 15.0 | 41.3 | 6.1 | 0.3 | 3.0 |

The slump was determined after 6 minutes and after 30 minutes in each case by tapping times on a slump table with a Hägermann cone (DIN EN 1015-3). The results are shown in Table 13.

TABLE 13

| Example | Slump after 6 min [cm] | Slump after 30 min [cm] | Density [g/cm$^3$] |
|---|---|---|---|
| Without additives | 15.7 | 15.2 | 1.98 |
| Comparative example (Melflux 2424) | 16.6 | 15.5 | 1.96 |
| Example 34 | 16.6 | 16.3 | 2.05 |
| Example 35 | 20.8 | 20.6 | 2.02 |
| Example 36 | 23.7 | 23.3 | 2.08 |
| Example 37 | 24.6 | 24.0 | 2.08 |

Example 39

Weighed out in a metal vessel were 100.0 g of a composite slag sand cement of type CEM III/A 32.5 N. The amount of dispersant indicated below, calculated as solids content, was mixed, taking account in the calculation of the water present in the dispersant, with the amount of water corresponding to a water/cement ratio of 0.3. In this context, the expression "bwoc" is intended to denote "% by weight, based on the amount of cement". Following addition of the water/dispersant mixture to the cement, the mixture was stirred intensely with a paddle stirrer for 1 minute. The cement paste obtained in this way was introduced into a metal cone (internal diameter top/bottom 2.0/4.0 cm, height 6.0 cm) which stood on a horizontally disposed glass plate. The metal cone was lifted, and the cement paste underwent slump flow. The slump flow ("SF" or "spread", diameter of the cement paste cake) was subsequently determined at 3 points, and the average was taken. The averaged values are shown in Table 14. (Glenium® SKY 115 is a commercial high-performance dispersant from BASF Construction Polymers GmbH, based on polycarboxylate ether.)

TABLE 14

| | Dispersant | Amount added [g] | Amount added [bwoc] | SF [cm] |
|---|---|---|---|---|
| Comparative 1 | Glenium ® SKY 115 | 0.67 | 0.67% | 10.8 |
| Comparative 2 | Glenium ® SKY 115 | 0.34 | 0.34% | <8 |
| Example 39 | Glenium ® SKY 115 | 0.34 | 0.87% | 10.6 |
| | Polycondensation product | 0.53 | | |

It was found that when the amount of high-performance dispersant added was halved (Comparative 2), it was, as expected, not possible to achieve the reference slump flow of the cement paste from Comparative 1. Only by adding the polycondensation product of the invention (Example 33) was it possible to bring back the slump flow almost to the reference level.

A defined amount of the cement paste thus obtained was transferred to a calorimeter, and the development of the heat of hydration was recorded calorimetrically. For this purpose, the calorimeter was equilibrated beforehand to 20.0° C. (isothermal reference calorimeter from TA Instruments, Model TAM-AIR). After 48 hours, measurement was halted and the data was evaluated. For this purpose, the differential heat generation dH/dt (mW/g, standardized for 1 g of cement paste) and also the integral heat generation H (J/g; after 6, 12, 24 and 48 hours) were employed. The results are shown in Table 15.

TABLE 15

| | dH/dt max. | H [J/g] | | | |
|---|---|---|---|---|---|
| | [mW/g] at t [h, min] | 6 h | 12 h | 24 h | 48 h |
| Comparative 1 | 1.58/23 h, 54 min | 5.52 | 10.96 | 47.60 | 146.11 |
| Example 39 | 1.66/18 h, 54 min | 5.76 | 13.48 | 71.59 | 157.00 |

It was found that significantly quicker hydration was achievable by using the polycondensation product from Example 33. In spite of the addition of polymer at a higher level overall, a significantly more rapid release of heat was observed, which suggests a quicker hydration of the cement. The maximum in the heat generation of the cement paste formulated using the polycondensation product of the invention was achieved after just 18 hours and 54 minutes, whereas the cement paste formulated using the commercial high-performance concrete plasticizer did not achieve its maximum heat generation until 5 hours later. This is also reflected in the integral heat generation; after 6, 12, 24 and 48 hours, the levels of heat generation observable were always higher.

Example 40

Weighed out in a metal vessel were 100.0 g of a composite slag sand/fly ash cement of type CEM V/A 32.5 N. The amount of dispersant indicated below, calculated as solids content, was mixed, taking account in the calculation of the water present in the dispersant, with the amount of water corresponding to a water/cement ratio of 0.33. Following addition of the water/dispersant mixture to the cement, the mixture was stirred intensely with a paddle stirrer for 1 minute. The cement paste obtained in this way was introduced into a metal cone (internal diameter top/bottom 2.0/4.0 cm, height 6.0 cm) which stood on a horizontally disposed glass plate. The metal cone was lifted, and the cement paste underwent slump flow. The slump flow was subsequently determined at 3 points, and the average was taken. The averaged values are shown in Table 16.

TABLE 16

| Dispersant | | Amount added [g] | Amount added [bwoc] | SF [cm] |
|---|---|---|---|---|
| Comparative 3 | Glenium ® SKY 115 | 0.67 | 0.67% | 17.0 |
| Example 40 | Glenium ® SKY 115 | 0.34 | 0.67% | 15.9 |
| | Polycondensation product | 0.33 | | |

It was found that when the amount of high-performance dispersant was halved and the polycondensation product of the invention was added, the reference slump flow of the cement paste from Comparative 3 could be raised to close to the reference level.

Example 41

Example 3 was repeated with 450 parts of poly(ethylene oxide) monophenyl ether (average molecular weight 5000 g/mol), 27.3 parts of 3,4-dihydroxybenzoic acid, 9.3 parts of paraformaldehyde and 49.4 parts of methanesulphonic acid (70%). The pH after neutralization with 50% strength aqueous sodium hydroxide solution was about 7.3. The polymer obtained was fully water-soluble and dark brown, in the form of an about 32.4% strength by weight aqueous solution. The molecular weight was about 12-23 kDa (Mp=11.6 and 22.5 kDa; GPC conditions as in Example 33).

Example 42

Example 20 was repeated with 262.5 parts of poly(ethylene oxide) monophenyl ether (average molecular weight 750 g/mol), 145.0 parts of salicylic acid, 50 parts of water, 46.5 parts of paraformaldehyde and 67.2 parts of methanesulphonic acid (70%). The pH after neutralization with 50% strength aqueous sodium hydroxide solution was about 7.3. The polymer obtained was fully water-soluble and yellowish, in the form of an about 28.0% strength by weight aqueous solution. The average molecular weight was about 5.4 kDa (GPC conditions as in Example 33).

Example 43

Example 20 was repeated with 300 parts of poly(ethylene oxide) monophenyl ether (average molecular weight 2000 g/mol), 82.9 parts of salicylic acid, 26.1 parts of paraformaldehyde and 72.1 parts of methanesulphonic acid (50%). The reaction took place at 105-108° C. The molecular weight was about 16 kDa.

Example 44

12.3 kg of ground slag sand ("GBFS") from Salzgitter, admixed with a 32.4% strength aqueous solution of the polymer from Example 41 (identified as "E41" in FIG. 1 and in Tables 17 and 18) or with a 28.0% strength aqueous solution of the polymer from Example 42 (identified as "E42" in FIG. 1 and in Tables 17 and 18) (in each case 0.03% by weight polymer, based on the weight of the sand) were ground for 125 minutes with stainless steel balls in a laboratory ball mill (LABBAS LM0504-S7, CEMTEC GmbH) without additional external heating. The resulting powder was sieved through a 5 mm sieve. For comparison, a GBFS sample without addition of additives (identified as "blank" in FIG. 1) was ground and sieved. The particle size distributions of the resultant powders were determined using a Mastersizer 2000 from Malvern Instruments, and the Blaine values were determined using a Blaine analyser from SEGER Tonindustrie. The particle size distributions are shown in FIG. 1. From each of the resulting samples of ground slag sand, 700 g were separated into "coarse" and "fine" fractions, using a 100 MZR (Plain) cyclone from Hosokawa Alpine with a set limit particle size of 15 µm, an air velocity of 49 m/s (constant) and a rotational speed of 6000 rpm. For each of the separated samples, the particle size distribution of the coarse and fine fractions was measured.

Example 45

Figure 2:
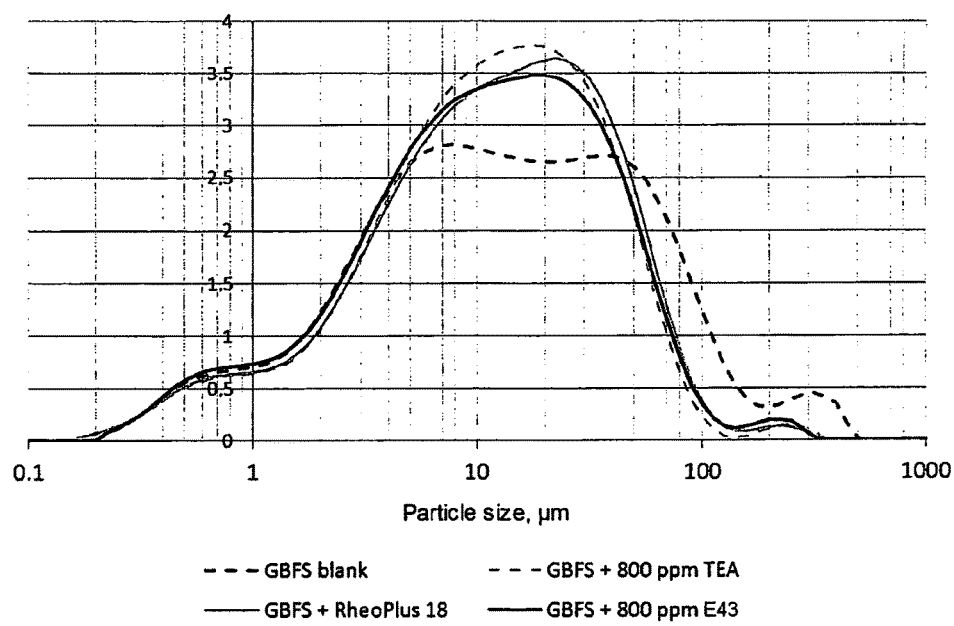
FIG. 2 shows a graphic representation of the particle size distributions of ground slag sand as a function of the grinding assistant used during hot grinding.

Example 44 was repeated. 0.08% by weight of each of the following additives, based on the weight of the ground slag sand, was used: "TEA" (triethanolamine), "RheoPlus 18" (44.2% strength aqueous solution, containing 5% of the defoamer Plurafac LF305), polymer from Example 41 (identified as "E41", in the form of a 32.4% strength aqueous solution, containing 5% of the defoamer Plurafac LF305), polymer from Example 42 (identified as "E42", in the form of a 28.0% strength aqueous solution, containing 5% of the defoamer Plurafac LF305) and polymer from Example 43 (identified as "E43" in FIG. 2, in the form of a 31.7% strength aqueous solution, containing 5% of the defoamer Plurafac LF305). Grinding took place at 120° C. Here again, for comparison, a GBFS sample without addition of additives (identified as "blank" in FIG. 2) was ground and sieved. FIG. 2 shows the corresponding particle size distributions.

Discussion:

FIG. 1 shows that the main difference in the particle size distribution lies in the region of the coarse particles (15-300 µm), in other words that the addition of the corresponding grinding assistant leads to a reduction in the amount of coarse particles, with a significant fall in the d (0.5) and d (0.9) values with the grinding assistants, and a significant increase in the Blaine values (cf. Table 17). The time for complete separation of the fractions is shortened when the grinding assistants of the invention are used, with beneficial consequences for the energy costs, and the average particle size of the coarse fraction is significantly reduced (cf. Table 18). From this it can be inferred that the polycondensation products of the invention enhance the grindability of the slag.

TABLE 17

| Sample | d (0.1) | d (0.5) | d (0.9) | d (0.450) | d (0.632) | n | Blaine | Density |
|---|---|---|---|---|---|---|---|---|
| GBFS "E42" | 1.403 | 10.556 | 45.621 | 8.816 | 16.885 | 1.03 | 3937 | 2.891 |
| GBFS "E41" | 1.375 | 10.69 | 49.021 | 8.875 | 17.391 | 0.98 | 3902 | 2.897 |
| GBFS "blank" | 1.419 | 11.528 | 65.982 | 9.38 | 20.158 | 0.97 | 3758 | 2.905 |

TABLE 18

| Sample | coarse/fine (m/m) | separation time [min] | d (0.5) of the fine fraction [μm] | d (0.5) of the coarse fraction [μm] |
|---|---|---|---|---|
| "E42" | 1.15 | 31 | 5.645 | 29.553 |
| "E41" | 0.76 | 31 | 5.584 | 28.249 |
| "blank" | 0.71 | 38 | 5.413 | 36.618 |

FIG. 2 and Table 19 show particle size distributions and Blaine values of slag sands ground hot with the various additives identified in Example 40. The average particle sizes d (0.5) of the slag sands ground with the polymers "E42" and "E43" are significantly smaller, and the corresponding Blaine values higher, than those of the sample without additives ("blank") and of the sample ground with "TEA" or RheoPlus 18 (high-performance cement plasticizer from BASF SE).

TABLE 19

| Sample | d (0.5) | d (0.9) | Blaine value |
|---|---|---|---|
| GBFS + "E42" | 10.54 | 43.36 | 3818 |
| GBFS + "E43" | 10.72 | 44.01 | 3877 |
| GBFS + "TEA" | 11.12 | 41.25 | 3735 |
| GBFS + "RheoPlus 18" | 11.72 | 45.17 | 3560 |
| GBFS + "E41" | 11.86 | 48.08 | 3612 |
| GBFS "blank" | 12.23 | 72.43 | 3482 |

We claim:

1. A process for forming a composition comprising mixing a polycondensation product with aqueous suspensions of inorganic binders including alkali-activated and/or alkali-activatable aluminosilicate binders in the composition, wherein the inorganic binders in the composition include less than 20% hydraulic cement based on the total weight of the inorganic binders, wherein said polycondensation product comprises as monomer components:

A) at least one aryl polyoxyalkylene ether of the formula (I)

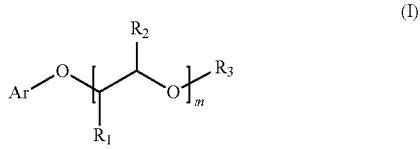

where
Ar is an aryl group,
$R_1$ and $R_2$ each independently of one another are selected from H, methyl and ethyl,
m is an integer from greater than or equal to 3 to 280 in the at least one aryl polyoxyalkylene ether of the formula (I) and
$R_3$ is selected from the group consisting of H, alkyl, aryl, aralkyl, alkaryl, phosphate, and also mixtures thereof;

B) at least one aromatic compound selected from the group consisting of benzene-1,2-diol, benzene-1,2,3-triol, 2-hydroxybenzoic acid, 2,3-dihydroxybenzoic acid, 3,4-dihydroxybenzoic acid, 3,4,5-trihydroxybenzoic acid, phthalic acid, 3-hydroxyphthalic acid, 2,3-dihydroxybenzenesulphonic acid, 3,4-dihydroxybenzenesulphonic acid, 1,2-dihydroxynaphthalene, 2,3-dihydroxynaphthalene, 1,2-dihydroxynaphthalene-5-sulphonic acid, 2,3-dihydroxynaphthalene-6-sulphonic acid, and mixtures thereof;

C) at least one aldehyde; and

D) at least one further aromatic compound, selected from the group consisting of 2-phenoxyethanol, 2-phenoxyethyl phosphate, 2-phenoxyethyl phosphonate, 2-phenoxyacetic acid, and mixtures thereof.

2. The process of claim 1, wherein the inorganic binders further comprise a latent hydraulic and/or a pozzolanic binder and also alkaline activators, optionally aqueous solutions of alkali metal carbonates, alkali metal fluorides, alkali metal hydroxides, alkali metal aluminates, alkali metal silicates, soluble waterglass, and also mixtures thereof.

3. The process of claim 1, wherein the polycondensation product is mixed with aqueous suspensions of inorganic binders including alkali-activated and/or alkali-activatable aluminosilicate binders as a constituent of construction material formulations and/or construction material products, on-site concrete, pre-cast concrete parts, concrete ware, cast concrete stones, in-situ concrete, air-placed concrete, ready-mixed concrete, construction adhesives, adhesives for thermal insulation composite systems, concrete repair systems, one-component sealing slurries, two-component sealing slurries, screeds, filling and levelling compounds, tile adhesives, renders, adhesives, sealants, coating systems optionally for tunnels, wastewater channels, splash protection and condensate lines, dry mortars, joint grouts, drainage mortars and/or repair mortars.

4. The process of claim 1, wherein the group Ar is an aryl group having 6 to 10 carbon atoms in the ring system.

5. The process of claim 1, wherein $R_3$ is selected from the group consisting of H, $C_{1-10}$ alkyl, $C_{6-10}$ aryl, $C_{7-11}$ aralkyl, $C_{7-11}$ alkaryl and phosphate.

6. The process of claim 1, wherein the oxyalkylene groups of the at least one aryl polyoxyalkylene ether of the formula (I) are selected from ethylene oxide groups and/or propylene oxide groups, which are arranged randomly, alternatingly, graduatedly or blockwise along the chain.

7. The process of claim 1, wherein the at least one aryl polyoxyalkylene ether of the formula (I) is a polyethylene glycol monophenyl ether of the formula (III)

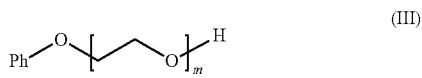

where m is an integer from 3 to 280.

8. The process of claim 7, wherein the polyethylene glycol monophenyl ether of the formula (III) is a mixture having different values for m.

9. The process of claim 1, wherein the aldehyde component C) is selected from the group consisting of formaldehyde, paraformaldehyde, glyoxylic acid, benzaldehyde, benzaldehydesulphonic acid, benzaldehydedisulphonic acid, vanillin and isovanillin, and also mixtures thereof.

10. The process of claim 1, wherein the molar ratio of components C:(A+B) is from 1:3 to 3:1.

11. The process of claim 1, wherein the molar ratio of components A:B is from 1:10 to 10:1.

12. The process of claim 1, wherein the polycondensation product is in the form of a comb polymer containing residues of aromatic monomer components joined by —$CH_2$— groups.

13. The process of claim 1, wherein the polycondensation product has a molecular weight in the range from 1000 to 100,000 g/mol.

14. The process of claim 1, wherein the inorganic binders include less than 10% hydraulic cement based on the total weight of the inorganic binders.

15. The process of claim 14, wherein the inorganic binders include less than 3% hydraulic cement based on the total weight of the inorganic binders.

16. The process of claim 1, wherein at least one of the groups $R_1$ and $R_2$ is H.

17. The process of claim 4, wherein the group Ar is a phenyl group or a naphthyl group.

* * * * *